(12) United States Patent
Saita et al.

(10) Patent No.: US 12,308,685 B2
(45) Date of Patent: May 20, 2025

(54) CHARGING CONTROL APPARATUS, MOVING BODY, CHARGING CONTROL SYSTEM, AND CHARGING CONTROL METHOD

(71) Applicant: HONDA MOTOR CO., LTD., Tokyo (JP)

(72) Inventors: Akira Saita, Tokyo (JP); Yu Fujimura, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 679 days.

(21) Appl. No.: 17/591,288

(22) Filed: Feb. 2, 2022

(65) Prior Publication Data
US 2022/0263333 A1 Aug. 18, 2022

(30) Foreign Application Priority Data
Feb. 12, 2021 (JP) ................. 2021-020565

(51) Int. Cl.
| | |
|---|---|
| H02J 7/00 | (2006.01) |
| B60L 50/60 | (2019.01) |
| B60L 53/62 | (2019.01) |
| B60L 53/64 | (2019.01) |
| B60L 53/66 | (2019.01) |
| B60L 58/12 | (2019.01) |

(Continued)

(52) U.S. Cl.
CPC .......... H02J 7/00712 (2020.01); B60L 50/60 (2019.02); B60L 53/62 (2019.02); B60L 53/64 (2019.02); B60L 53/665 (2019.02); B60L 58/12 (2019.02); B60L 58/13 (2019.02); B60L 58/16 (2019.02); G06Q 10/1097 (2013.01); H02J 7/0047 (2013.01); H02J 7/0048 (2020.01); H02J 7/005 (2020.01); H02J 7/0071 (2020.01)

(58) Field of Classification Search
CPC ...... H02J 7/00712; H02J 7/0048; H02J 7/005; H02J 7/0071; B60L 50/60; B60L 53/62; B60L 53/665; B60L 58/12; B60L 58/13; B60L 58/16; B60L 53/64; G06Q 10/1097
USPC ........................................... 320/133
See application file for complete search history.

(56) References Cited

U.S. PATENT DOCUMENTS

2002/0109506 A1 * 8/2002 Kawakami ........... G01R 31/392
 324/522
2013/0204445 A1 * 8/2013 Ikeda ...................... H02J 3/14
 700/286

(Continued)

FOREIGN PATENT DOCUMENTS

JP 2012-186906 A 9/2012
JP 2013-210340 A 10/2013

(Continued)

OTHER PUBLICATIONS

Office Action dated Nov. 12, 2024 issued in the corresponding Japanese Patent Application No. 2021-020565 with the English machine translation thereof.

Primary Examiner — Zixuan Zhou
(74) Attorney, Agent, or Firm — Carrier, Shende & Associates P.C.; Joseph P. Carrier; Jeffrey T. Gedeon

(57) ABSTRACT

With a charging control apparatus, a current SOC and target SOC of a battery and an electricity cost per unit power of charging equipment are acquired. Then, a charging schedule is set that lowers the deterioration acceleration of the battery by making a comparison between the current SOC and the target SOC, while considering the electricity cost.

17 Claims, 7 Drawing Sheets

(51) Int. Cl.
*B60L 58/13* (2019.01)
*B60L 58/16* (2019.01)
*G06Q 10/1093* (2023.01)

(56) References Cited

U.S. PATENT DOCUMENTS

| | | | | |
|---|---|---|---|---|
| 2015/0314690 A1* | 11/2015 | Buia | ............ | B60L 3/04 |
| | | | | 320/155 |
| 2016/0047862 A1* | 2/2016 | Shimizu | ............ | G06Q 20/145 |
| | | | | 702/63 |
| 2023/0391221 A1* | 12/2023 | Matsuda | ............ | H02J 7/0071 |

FOREIGN PATENT DOCUMENTS

| | | |
|---|---|---|
| JP | 2015-061401 A | 3/2015 |
| JP | 2017-134571 A | 8/2017 |
| JP | 2017-135926 A | 8/2017 |
| JP | 2019-154167 A | 9/2019 |

\* cited by examiner

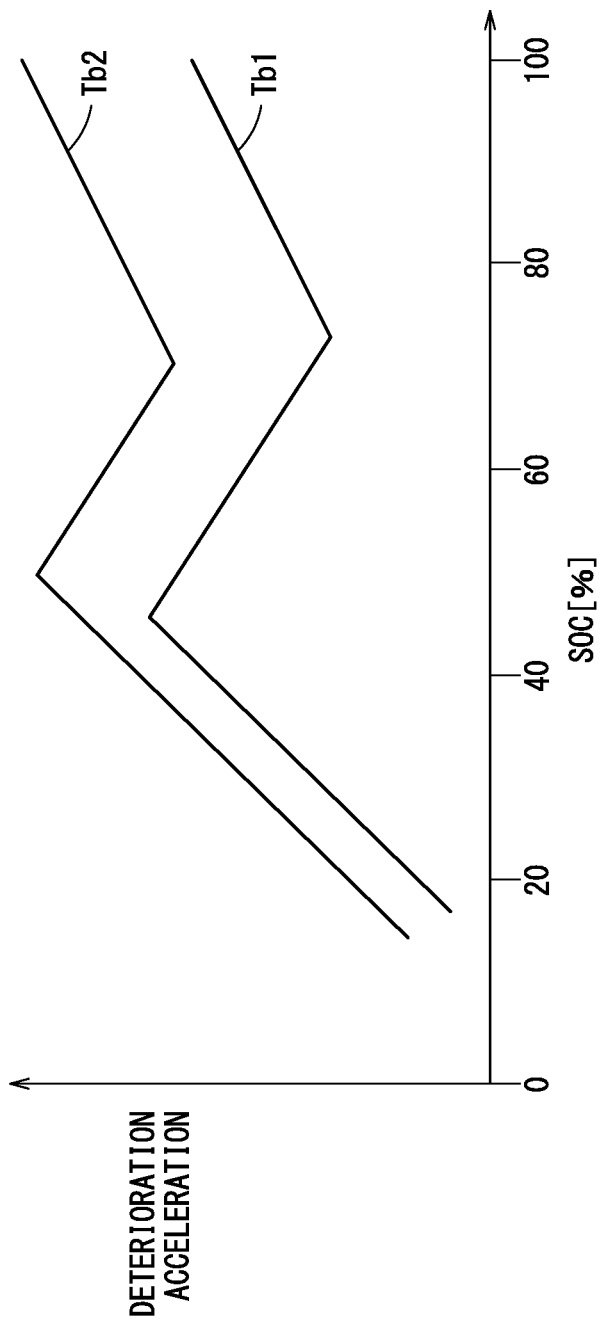

CHARGING CONTROL APPARATUS, MOVING BODY, CHARGING CONTROL SYSTEM, AND CHARGING CONTROL METHOD

CROSS-REFERENCE TO RELATED APPLICATIONS

This application is based upon and claims the benefit of priority from Japanese Patent Application No. 2021-020565 filed on Feb. 12, 2021, the contents of which are incorporated herein by reference.

BACKGROUND OF THE INVENTION

Field of the Invention

The present invention relates to a charging control apparatus, a moving body, a charging control system, and a charging control method.

Description of the Related Art

JP 2012-186906 A discloses charging a battery, which is loaded in an electric automobile, from an external power source. Specifically, when a date and time of subsequent travel of the electric automobile is set, the battery is charged during a low-cost time period immediately before the subsequent travel.

JP 2019-154167 A discloses an operation of charging a battery of an electric vehicle. With this battery, primary charging and secondary charging are performed in order during a time period from a charging start timing to a charging completion timing. With the primary charging, the battery is charged up to immediately before a mid-SOC region, in order to shorten the time during which the battery is subjected to a SOC region and temperature region where deterioration tends to be accelerated during charging. With the secondary charging, the battery is charged until the charging completion timing to reach a full charge state.

SUMMARY OF THE INVENTION

JP 2012-186906 A discloses battery charging control that takes the electricity cost into consideration. JP 2019-154167 A discloses battery charging control that takes battery deterioration caused by the SOC into consideration. However, neither JP 2012-186906 A nor JP 2019-154167 A investigates controlling the charging of the battery while taking both electricity cost and battery deterioration into consideration.

In light of the above, there is a desire to realize both a reduction in the electricity cost and suppression of the battery deterioration.

The present invention has the object of realizing the above desire.

A first aspect of the present invention is a charging control apparatus that controls charging of a battery from an external power source, comprising a current state of charge (SOC) acquiring section that acquires a current SOC of the battery; a target SOC acquiring section that acquires a target SOC; an electricity cost acquiring section that acquires an electricity cost per unit of power of the external power source; and a charging schedule setting section that, by considering the electricity cost and comparing the current SOC to the target SOC, sets a charging schedule of the battery in a manner to lower deterioration acceleration of the battery.

A second aspect of the present invention is a moving body comprising the charging control apparatus described above and a battery.

A third aspect of the present invention is a charging control system comprising the charging control apparatus described above and a battery.

A fourth aspect of the present invention is a charging control method for controlling charging of a battery from an external power source, comprising a step of acquiring a current SOC of the battery with a current SOC acquiring section; a step of acquiring a target SOC of the battery with a target SOC acquiring section; a step of acquiring an electricity cost per unit power of the external power source with an electricity cost acquiring section; and a step of setting a charging schedule with a charging schedule setting section such that deterioration acceleration of the battery is lowered, by considering the electricity cost and making a comparison between the current SOC and the target SOC.

In the present invention, the battery charging schedule is set in consideration of both the electricity cost and the deterioration characteristic of the battery (ease of deterioration of the battery) before charging and after charging. By charging the battery from the external power source in accordance with this charging schedule, it is possible to suppress the battery deterioration while reducing the electricity cost.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a chart illustrating a relationship between the SOC and the deterioration acceleration of a battery;

DESCRIPTION OF THE INVENTION

Figure 1:
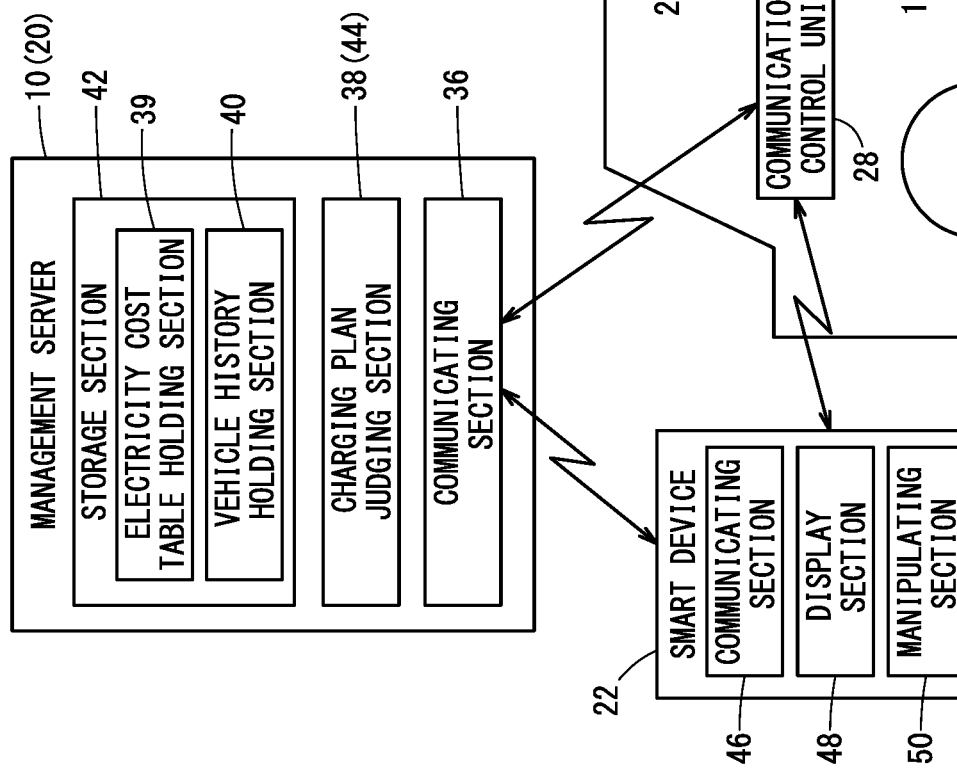
FIG. 1 is a block diagram of a charging control system that includes a charging control apparatus and a vehicle, according to an embodiment.

FIG. 1 is a block diagram of a charging control system 14 including a charging control apparatus 10 and a battery 12, according to an embodiment. The charging control system 14 includes a vehicle 16, charging equipment 18, a management server 20, and a smart device 22. The vehicle 16 is a moving body on which the battery 12 is loaded. The charging equipment 18 is a power source outside the vehicle 16. The smart device 22 is an information communication device that is used by a user. The user is a user of the battery 12. The user is also a user of the vehicle 16. The charging control apparatus 10 controls charging of the battery 12 in the vehicle 16 from the charging equipment 18. In the description below, a case is described in which the management server 20 is the charging control apparatus 10.

In the present embodiment, the moving body is an object capable of moving (being driven) by the supply of power from the battery 12. The present embodiment is applicable to various types of moving bodies including various vehicles such as two-wheel, three-wheel, and four-wheel vehicles, flying bodies such as airplanes, boats, and the like. The present invention is not limited to a moving body, and is also applicable to charging control of a battery 12 in various types of devices that are driven by the supply of power from the battery 12.

In the present embodiment, a case is described in which the battery 12 is charged from the charging equipment 18 that is a plug-in type, as shown in FIG. 1. In the present embodiment, the charging equipment 18 is capable of charging the battery 12 using a non-contact power supply method.

In a case where the moving body is a vehicle 16, an electric vehicle that travels using power supplied from the battery 12 is included in the scope of this vehicle 16. Furthermore, the vehicle 16 may be a hybrid vehicle. A hybrid vehicle includes a motor and an internal combustion engine. The motor receives the power supplied from the battery 12 to provide drive.

In the present embodiment, an ECU (not shown in the drawings) inside the vehicle 16 may be the charging control apparatus 10. Alternatively, the smart device 22 may be the charging control apparatus 10.

The vehicle 16 includes the battery 12, a charging implementing section 24, an on-board display 26, a communication control unit 28, and a charging port 30. The charging equipment 18 is installed on the premises of the home of the user who uses the vehicle 16, for example. A cable 32 extends from the charging equipment 18. The tip of the cable 32 is provided with a charging connector 34 (charging gun). When the vehicle 16 is on the premises, the user inserts the charging connector 34 into the charging port 30. When the charging connector 34 is inserted into the charging port 30, the charging equipment 18 can charge the battery 12. When the charging connector 34 is connected to the charging port 30, the charging implementing section 24 causes the charging equipment 18 to perform charging of the battery 12, in accordance with control from the management server 20. The charging implementing section 24 can acquire various types of information concerning the vehicle 16, using various sensors. The various types of information concerning the vehicle 16 include information concerning the battery 12. Such information includes the SOC of the battery 12, the temperature of the battery 12, and the temperature outside the vehicle 16. In the following description, the temperature of the battery 12 is referred to as the battery temperature.

The on-board display 26 is a navigation apparatus or the like provided to the vehicle 16. The on-board display 26 displays various types of information as images. The on-board display 26 is capable of outputting the various types of information as sound. The on-board display 26 includes a manipulating section. The manipulating section is a touch panel or the like that receives manipulation input from the user.

The communication control unit 28 is capable of transmitting and receiving information through wireless communication, between the management server 20 and the smart device 22. As an example, the communication control unit 28 receives instruction content concerning the charging control of the battery 12 from the management server 20, and outputs this instruction content to the charging implementing section 24. The communication control unit 28 transmits various types of information concerning the battery 12 acquired by the charging implementing section 24 to the management server 20.

The management server 20 includes a communicating section 36, a control section 38 (current SOC acquiring section, target SOC acquiring section, electricity cost acquiring section, charging schedule setting section, scheduled drive timing acquiring section, deterioration acceleration acquiring section, and evaluation value acquiring section), and a storage section 42. The storage section 42 includes an electricity cost table holding section 39 and a vehicle history holding section 40. The control section 38 is a CPU of the management server 20. By reading and executing a program stored in the storage section 42, the control section 38 functions as a charging plan judging section 44. The charging plan judging section 44 performs a charging schedule setting and the like. The charging schedule is a schedule for causing the charging equipment 18 to charge the battery 12. The detailed function of the charging plan judging section 44 is described further below.

The communicating section 36 is capable of transmitting and receiving information through wireless communication to and from the communication control unit 28 of the vehicle 16. The communicating section 36 is capable of transmitting and receiving information through wireless communication to and from the smart device 22. The communicating section 36 receives various types of information concerning the vehicle 16, for example. This information includes the SOC, battery temperature, and outside temperature described above.

The communicating section 36 is capable of receiving information about electricity cost per unit of power of the charging equipment 18, from a power company that the user has formed a contract with. Alternatively, the communicating section 36 is capable of receiving information about electricity cost per unit of power of the charging equipment 18 from a power aggregator acting as an intermediary between the user and the power company. Specifically, the information about the electricity cost is a function of electricity cost (electricity cost function) for a cost plan and elapsed time of the charging equipment 18. The received cost plan of the charging equipment 18 is stored in the electricity cost table holding section 39. Accordingly, an electricity cost table based on the contract of the user is stored in the electricity cost table holding section 39. Alternatively, in the case of a variable tariff rate contract in which the electricity cost varies in prescribed units according to a supply and demand balance for power every day, the electricity cost table of the electricity cost table holding section 39 is updated automatically by having the communicating section 36 communicate periodically with the power company or the power aggregator.

The smart device 22 includes a communicating section 46, a display section 48, and a manipulating section 50. The communicating section 46 is capable of transmitting and receiving information through wireless communication to and from the communicating section 36 of the management server 20. The communicating section 46 is capable of transmitting and receiving information through wireless communication to and from the communication control unit 28 of the vehicle 16. The display section 48 displays various types of information as images. The manipulating section 50 is a touch panel or the like that receives manipulation input from the user.

The following describes an overview of the charging control of the battery 12 according to the present embodiment, while referencing FIGS. 2 to 4B. In the power control of the present embodiment, the charging schedule of the battery 12 is set in consideration of the cost plan and the deterioration characteristic of the battery 12 (see FIG. 1) before charging and after charging (ease of qualitative deterioration of the battery 12). Furthermore, in the charging control, the charging equipment 18 is caused to charge the battery 12 in accordance with the set charging schedule, thereby reducing the electricity cost and suppressing deterioration of the battery 12.

Figure 2:
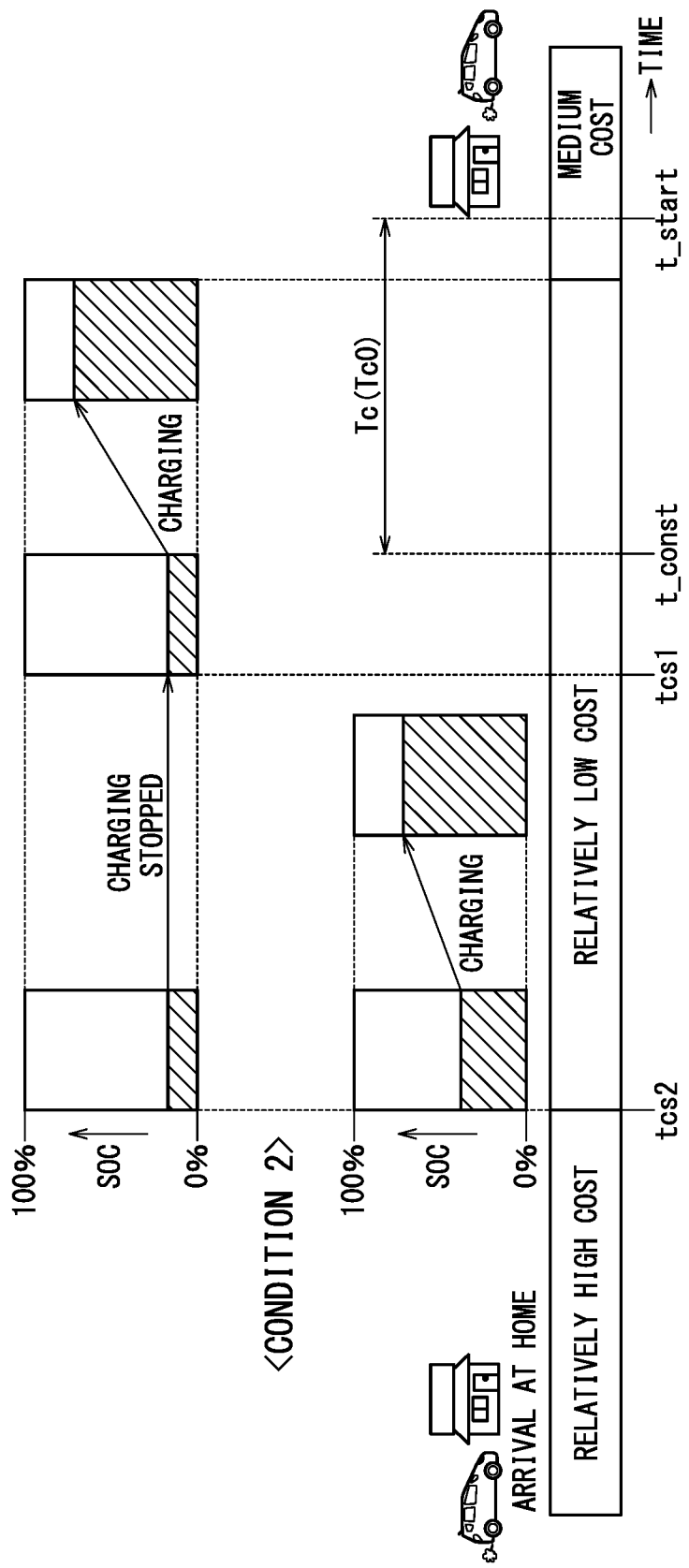
FIG. 2 is a descriptive diagram showing an overview of the embodiment.

FIG. 2 is a descriptive diagram showing an overview of the charging control of the present embodiment. In FIG. 2, the user drives the vehicle 16 (see FIG. 1) and arrives back home. After this, the charging equipment 18 is caused to charge the battery 12. The charging of the battery 12 is performed in a time period from when the user arrives at home to when the user drives the vehicle 16 and departs from home. As an example, a case is described of a fee contract in which the electricity cost changes according to the time period. FIG. 2 shows a case where the cost transitions from a relatively high cost to a relatively low cost, and then transitions to a medium cost. The present embodiment can also be easily applied to a case of a variable tariff rate contract. With a variable tariff rate, the electricity cost per unit of power varies flexibly in 30-minute units, for example, according to the supply and demand balance for power. In the following description, the electricity cost per unit of power is also referred to as the electricity unit cost.

As described above, with the techniques of JP 2012-186906 A and JP 2019-154167 A, the battery 12 was charged to a full charge before the timing at which the vehicle 16 is scheduled to depart from home. In the following description, the timing at which the vehicle 16 is scheduled to depart from home is referred to as a scheduled departure timing t_start (scheduled drive timing). However, with the conventional techniques, there are cases where the battery 12 deteriorates more easily after charging is completed than before charging starts. Furthermore, in consideration of the of the cost plan, if the battery 12 is charged during a time period when the electricity cost is relatively low, it is possible to reduce the electricity cost.

FIG. 3 shows a relationship between the SOC of the battery 12 (see FIG. 1) and the deterioration acceleration of the battery 12. As shown in FIG. 3, in a region where the SOC is less than 50%, the deterioration acceleration of the battery 12 increases in accordance with an increase of the SOC. In the region where the SOC is greater than or equal to 50% and less than 70%, the deterioration acceleration of the battery 12 decreases in accordance with an increase of the SOC. In the region where the SOC is greater than or equal to 70%, the deterioration acceleration of the battery 12 increases in accordance with an increase of the SOC.

Strictly speaking, the deterioration acceleration of the battery 12 changes depending on the battery temperature. FIG. 3 shows the deterioration acceleration of the battery 12 in cases where the battery temperature is Tb1 and Tb2 (Tb1<Tb2), as examples.

Accordingly, there are cases where the deterioration of the battery 12 accelerates depending on the SOC value. As an example, as shown in FIG. 3, the deterioration acceleration of the battery 12 is high when the SOC is near 50% and when the SOC is greater than or equal to 90%. Therefore, when the battery 12 has been charged using an SOC resulting in a high deterioration acceleration as the target value (target SOC), the deterioration of the battery 12 is prone to accelerating after the charging ends.

As an example, in "Condition 1" of FIG. 2, after the vehicle 16 (see FIG. 1) has arrived at home, charging of the battery 12 is not performed for a certain period. Under Condition 1, the battery 12 is charged during a time period from the timing tcs1, within a relatively low-cost time period. There is a possibility that, when the battery 12 is left idle for a certain time, the battery capacity (state of health, SOH) will decrease due to idle deterioration. However, if the SOC immediately after arriving at home is approximately 20%, the idle deterioration will progress relatively slowly even when charging is not performed for a certain time. Under Condition 1, the battery 12 is charged to increase the SOC from approximately 20% to approximately 70% during the time period from the timing tcs1, which is the timing that is the certain time later than when the vehicle arrived at home. The deterioration acceleration when the SOC is 70% is higher than the deterioration acceleration when the SOC is 20%. Therefore, when the charging of the battery 12 has ended in a state where the SOC is 70%, the SOH decrease amount becomes relatively greater due to the idle deterioration. In other words, in the case of Condition 1, the battery 12 deteriorates more easily after charging has ended than before charging starts.

Under "Condition 2" of FIG. 2, after the vehicle 16 has arrived at home, at the timing tcs2, which is an early timing in the relatively low-cost time period, the charging of the battery 12 is started. Under Condition 2, the SOC before charging starts is approximately 45%. Under Condition 2, the battery 12 is charged with an SOC of approximately 70% as the target SOC. The deterioration acceleration when the SOC is 45% is greater than the deterioration acceleration when the SOC is 70%. Therefore, under Condition 2, the deterioration of the battery 12 is prone to accelerating more before charging starts than after charging has ended.

In this way, the deterioration acceleration of the battery 12 changes according to the SOC value. Therefore, in the present embodiment, the battery 12 is charged in a manner to relatively lower the deterioration acceleration of the battery 12.

Figure 4A:
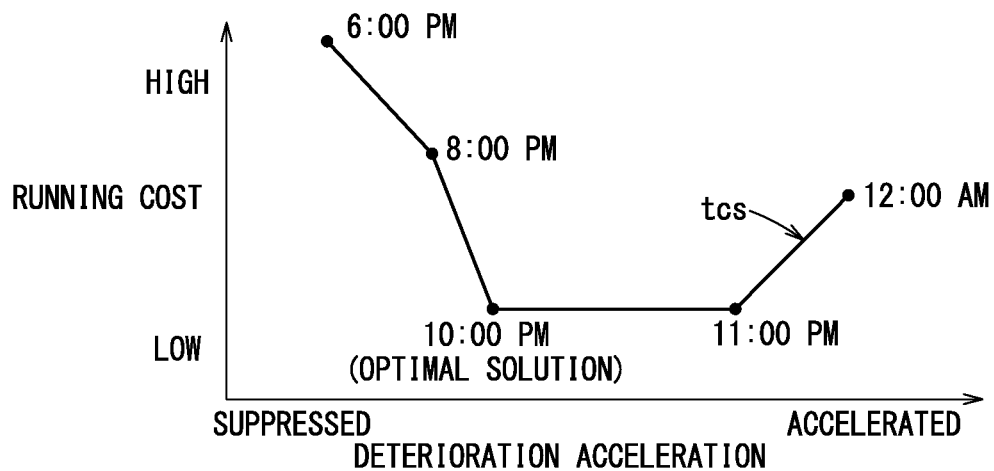
FIGS. 4A and 4B are charts respectively illustrating show a relationship between the deterioration acceleration and the electricity cost.
Figure 4B:
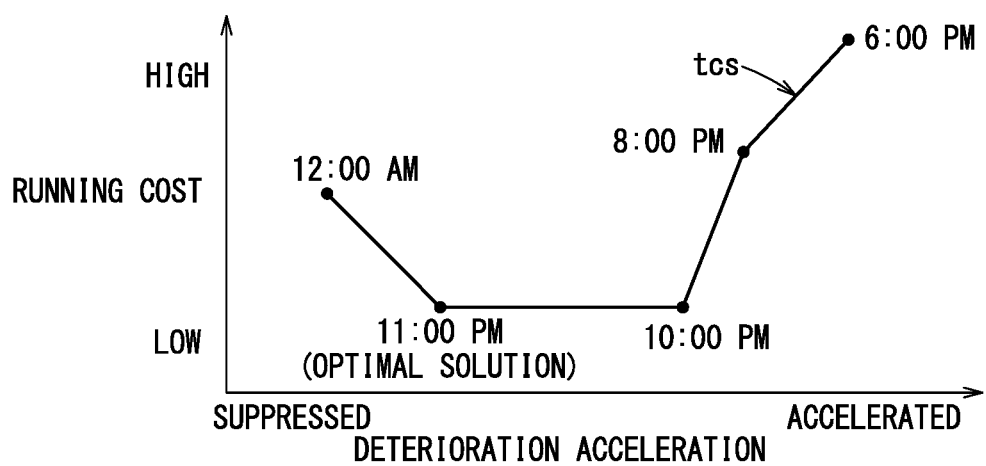

FIGS. 4A and 4B are diagrams showing a relationship between the deterioration acceleration of the battery 12 (see FIG. 1) and the electricity cost. FIGS. 4A and 4B show the relationship between the deterioration acceleration of the battery 12 and the electricity cost using the timing at which charging of the battery 12 starts as a parameter. In the following description, the timing at which charging of the battery 12 starts is referred to as the charging start timing tcs. FIG. 4A is a diagram showing the relationship between the charging start timing tcs, the deterioration acceleration, and the electricity cost. FIG. 4A shows an example of a case where the charging is performed from an SOC of 50% to an SOC of 80%. FIG. 4B is a diagram showing a relationship between the charging start timing tcs, the deterioration acceleration, and the electricity cost. FIG. 4B shows an example of a case in which charging is performed from an SOC of 20% to an SOC of 80%.

In the case of FIG. 4A, if the charging start timing tcs is set to 10:00 PM, it is possible to realize a reduction of the electricity cost and suppression of the deterioration of the battery 12 after charging ends. In FIG. 4A, 10:00 PM is the optimal charging start timing tcs. In the following description, the optimal charging start timing tcs is referred to as the optimal timing tcs_opt. In the case of FIG. 4B, if the charging start timing tcs is set to 11:00 PM, it is possible to realize a reduction of the electricity cost and suppression of the deterioration of the battery 12 after charging ends. In FIG. 4B, 11:00 PM is the optimal timing tcs_opt.

In this way, the charging of the battery 12 should be started from the optimal timing tcs_opt, in consideration of the electricity cost in each time period and the ease of qualitative deterioration of the battery 12 before charging and after charging. In other words, the charging of the battery 12 should be started from the optimal timing tcs_opt in consideration of the electricity cost in each time period and the deterioration characteristic of the battery 12 before charging and after charging. Due to this, it is possible to suppress the deterioration of the battery 12 after charging ends while reducing the electricity cost.

Figure 5:
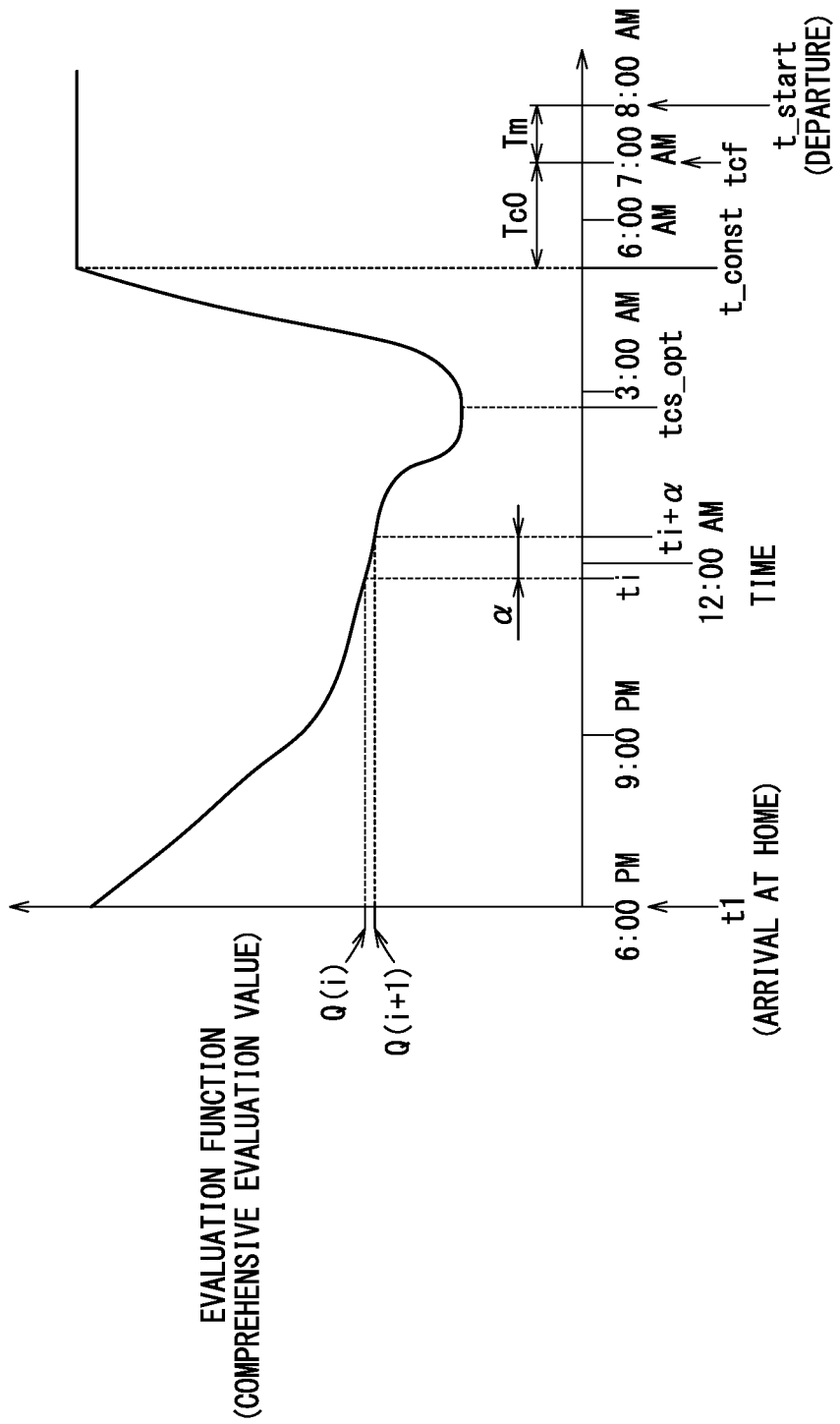
FIG. 5 is a chart illustrating change over time of an evaluation function (evaluation value)
Figure 6:
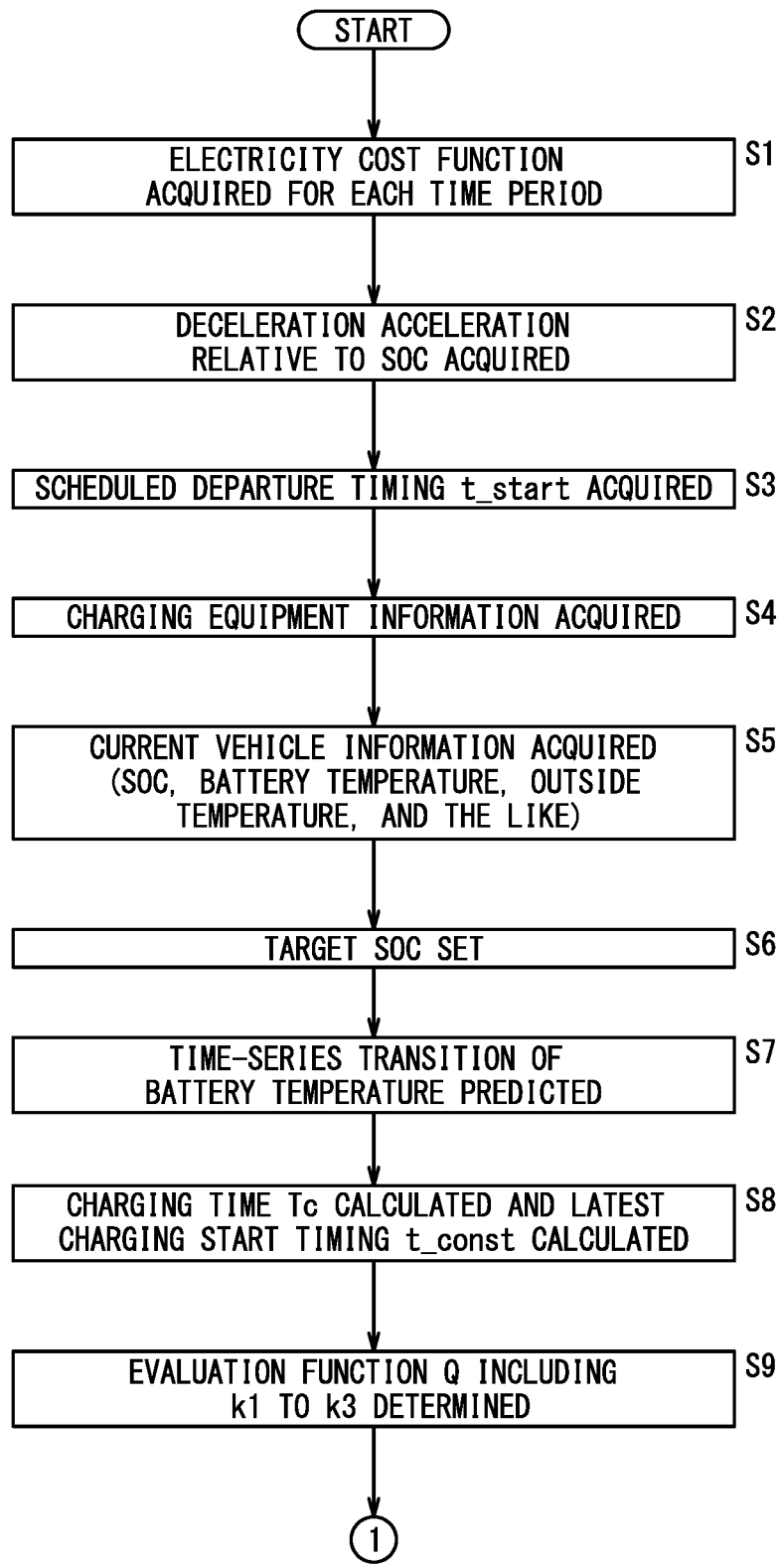
FIG. 6 is a flow chart of the charging control.
Figure 7:
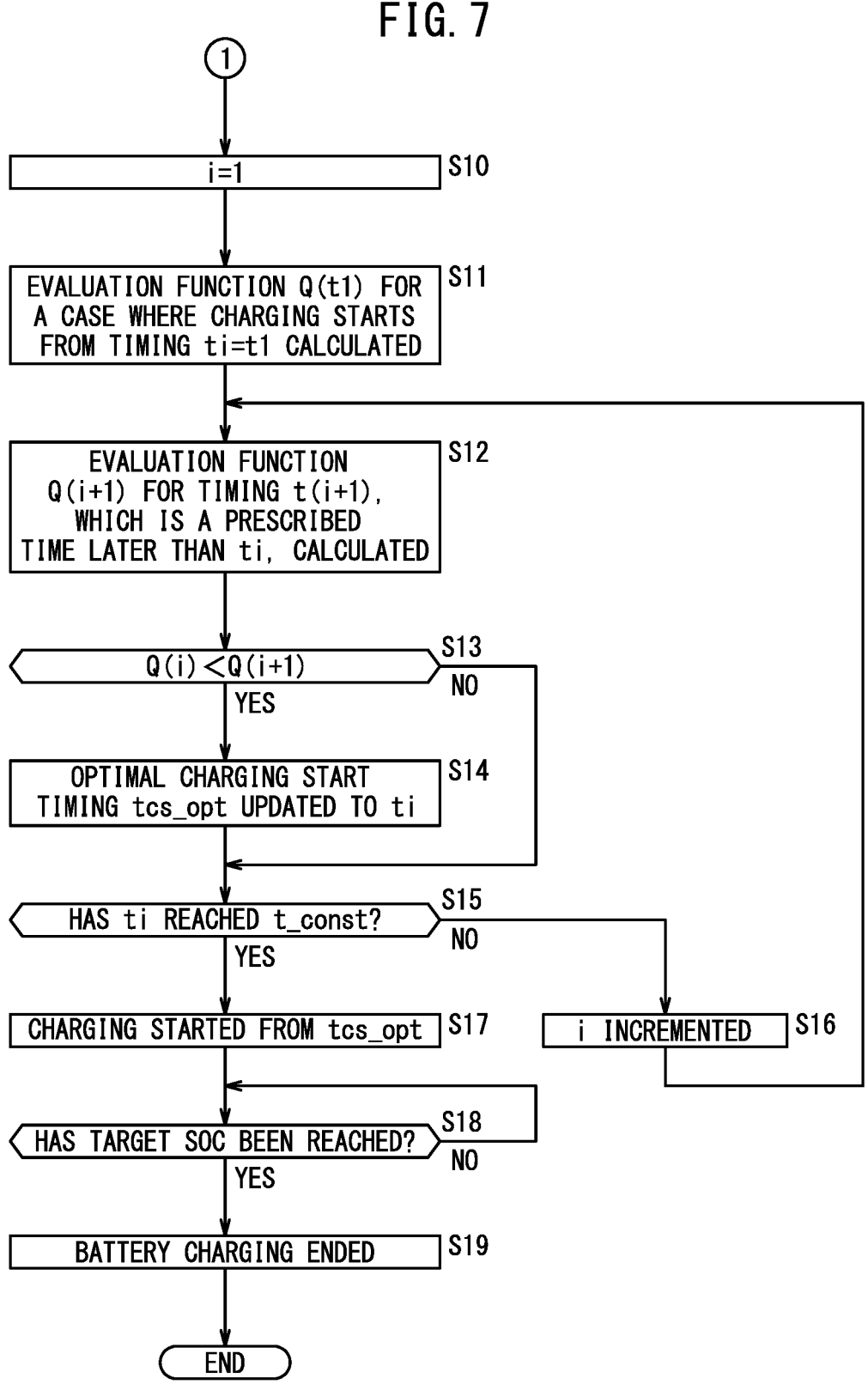
FIG. 7 is a flow chart of the charging control.

The following describes specific charging control, while referencing FIGS. 5 to 7. This specific charging control is a specific example of the overview of the charging control shown in FIGS. 2 to 4B.

In this specific example, the vehicle 16 (see FIG. 1) of the user arrives at home at 6:00 PM (timing t1) on a certain day, as shown in FIG. 5. The vehicle 16 departs from home at 8:00 AM on the following day. Accordingly, the scheduled departure timing t_start is 8:00 AM on the following day. Furthermore, the charging of the battery 12 must be finished, at the latest, before the scheduled departure timing t_start. In this specific example, the charging of the battery 12 ends at 7:00 AM on the following day. In other words, in this specific example, the charging of the battery 12 is ended in consideration of a margin of a certain time Tm (Tm=1 hour). In the following description, the latest timing at which charging of the battery 12 must be completed is referred to as the charging end timing tcf.

The charging time Tc of the battery 12 is determined by the SOC value at the current time (current SOC), the SOC target value (target SOC), the characteristics of the charging equipment 18, and the temperature around the battery 12. Examples of the characteristics of the charging equipment 18 include whether normal charging is to be performed, whether quick charging is to be performed, and the like. In this specific example, the charging start timing tcs (optimal timing tcs_opt) must be set such that the charging of the battery 12 is certain to end by the charging end timing tcf. In this case, by back-calculating the charging time Tc from the charging end timing tcf, it is possible to calculate the latest charging start timing t_const. Accordingly, if the charging of the battery 12 is stated before the charging start timing t_const, the charging of the battery 12 will be completed by the charging end timing tcf. Furthermore, if the charging of the battery 12 is started after the charging start timing t_const, the charging of the battery 12 will not be completed by the charging end timing tcf.

The cost plan is set according to the power company that the user has made a contract with. In this cost plan, the electricity cost differs according to the time period, for example. In this specific example, the electricity cost for the time period from the home arrival timing (6:00 PM) to 8:00 PM is a relatively high cost. The electricity cost for the time period from 8:00 PM to 10:00 PM is a medium cost, which is lower than the relatively high cost. The electricity cost for the time period from 10:00 PM to 6:00 AM on the following day is a relatively low cost, which is the lowest cost. The time period from 6:00 AM on the following day is a medium-cost time period.

In this specific example, an attempt is made to optimize the charging start timing tcs by charging the battery 12 for a desired charging time Tc including the relatively low-cost time period. Due to this, charging of the battery 12 is started from the optimal timing tcs_opt that is before the charging start timing t_const. As a result, the charging ends by the charging end timing tcf. A reduction of the electricity cost and suppression of the deterioration of the battery 12 after charging ends are realized. Furthermore, in the specific example, the optimal timing tcs_opt is specified using an evaluation function Q(t) shown in FIG. 5. In the following description, for the sake of convenience, the value of the evaluation function Q(t) may be referred to as the "comprehensive evaluation value Q(t)".

The evaluation function Q(t) is a function for comprehensively evaluating the electricity cost, the deterioration acceleration of the battery 12, and whether charging will be completed in the time period from the charging start timing tcs to the charging end timing tcf. In other words, in a time period from the timing t1 to the charging end timing tcf, the battery 12 starts being charged from a given timing ti and is charged from the current SOC to the target SOC over the charging time Tc (ti). The evaluation function Q(t) is a function for comprehensively evaluating the charging of the battery 12 over the charging time Tc(ti), using the electricity cost and the deterioration acceleration of the battery 12. The evaluation function Q(t) is obtained at each timing ti, as shown in FIG. 5.

When the charging start timing tcs (timing ti) has changed, the battery temperature at the timing ti changes due to the effect of the temperature outside the vehicle 16. As a result, there is a possibility of the charging time Tc changing. In this way, the charging time Tc changes depending on the charging start timing tcs and the battery temperature. In the following description, the charging time Tc used when the charging starts from the given timing ti is also referred to as the charging time Tc(ti). The charging time Tc used when the charging starts from the charging start timing t_const is also referred to as the charging time Tc(t_const).

Specifically, the evaluation function Q(t) is expressed in Expression (1) below.

$$Q(t) = k1 \times (\text{electricity cost evaluation function } Q\text{cost}(t)) + k2 \times (\text{battery deterioration evaluation function } Q\text{bat}(t)) + k3 \quad \text{Expression (1):}$$

Here, the first term in Expression (1) is referred to as the electricity cost evaluation value. The electricity cost evaluation function Qcost(t) in the electricity cost evaluation value is a function for evaluating the electricity cost in a case where charging is started from the timing ti. Furthermore, k1 is a first weighting coefficient for the electricity cost evaluation function Qcost(t). The electricity cost evaluation function Qcost(t) is expressed in Expression (2) below.

$$Q\text{cost}(t) = \Sigma(\text{charging equipment 18 effective power } P(t) \times \text{electricity unit cost } M(t)) \quad \text{Expression (2):}$$

P(t) is the effective power supplied from the charging equipment 18 to the battery 12 in the case where charging is started from the given timing ti. M(t) is the electricity cost per unit of power (unit price of electricity cost) in the case where charging is started from the given timing ti. Σ is a mathematical symbol indicating the summation of P(t)×M(t) from the charging start to the charging end of the battery 12. Expression (2) shows the time integral of the electricity cost from the charging start to the charging end of the battery 12. In other words, Expression (2) shows the time integral of the electricity cost from the timing ti to the timing (ti+Tc(ti)). Accordingly, the electricity cost evaluation value at the given timing ti is calculated by integrating, from the timing ti to the charging end timing (ti+Tc(ti)), the value obtained by multiplying together the effective power P(t) of the charging equipment 18 and the electricity unit cost M(t) at each timing t.

The effective power P(t) of the charging equipment 18 depends on (1) the characteristics of the charging equipment 18, (2) the battery temperature that changes due to the effect of the temperature outside the vehicle 16 and the like, and (3) the operational state of high-voltage auxiliary device (load) mounted on the vehicle 16. Examples of such an operational state include air conditioning inside the vehicle 16, heating for the battery 12, and the like. Furthermore, the effective power P(t) changes according to the charging start timing tcs (timing ti). The effective power P(t) of the charging equipment 18 is not always constant. Accordingly, the effective power P(t) is calculated by predicting the time-series change of the battery temperature and the operational state of the load of the vehicle 16, from the timing ti to the charging end timing (ti+Tc(ti)).

Due to this, even in a case where an operation is performed to heat the battery 12 in a low-temperature environment, it is possible to accurately calculate the electricity cost evaluation value. Furthermore, even if the user sets a timer function for air conditioning and the air conditioner operates for a certain time Tm in accordance with the scheduled departure timing t_start, for example, it is possible to accurately calculate the electricity cost evaluation value.

As made clear from Expression (2), the electricity cost evaluation value becomes greater as the electricity cost becomes higher. Furthermore, the electricity cost evaluation value becomes smaller as the electricity cost becomes lower.

The second term in Expression (1) is referred to as the battery deterioration evaluation value. The battery deterioration evaluation function Qbat(t) in the battery deterioration evaluation value is a function for evaluating the deterioration of the battery 12 in a case where charging is started from the timing ti. Furthermore, k2 is a second weighting coefficient for the battery deterioration evaluation function Qbat(t), corresponding to the deterioration acceleration (see FIG. 3) of the battery 12. The battery deterioration evaluation function Qbat(t) is expressed in Expression (3) below.

$$Qbat(t) = \Sigma k(t) \times t \qquad \text{Expression (3):}$$

Here, k(t) indicates the idle deterioration characteristic corresponding to the SOC of the battery 12. The idle deterioration characteristic k(t) is defined based on the deterioration acceleration of the battery 12 such as shown in FIG. 3. Σ is a mathematical symbol indicating the summation of k(t)×t from the charging start to the charging end of the battery 12. Expression (3) shows the time integration of the idle deterioration characteristic k(t), which differs according to the SOC value, from the charging start to the charging end of the battery 12.

As described above, strictly speaking, the deterioration acceleration (see FIG. 3) of the battery 12 depends on the battery temperature. That is, the deterioration acceleration changes according to the battery temperature. Therefore, the idle deterioration characteristic k(t) may be an idle deterioration characteristic that corresponds to the SOC and battery temperature of the battery 12 and is defined based on the deterioration acceleration of the battery 12. In such a case, the idle deterioration characteristic k(t) is defined based on the deterioration acceleration of the battery 12. Expression (3) indicates the time integration, from the timing t1 to the scheduled departure timing t_start, of the idle deterioration characteristic k(t) that differs according to the SOC and also differs according to the battery temperature. In FIG. 3, only the relationship between the SOC and the deterioration acceleration of the battery 12 is shown.

Accordingly, the idle deterioration characteristic k(t) is calculated by predicting the SOC and battery temperature at the given timing ti. In other words, the time-series changes of the SOC and the battery during the charging from the timing ti to the charging end timing (ti+Tc(ti)) can be predicted based on the time-series change of the battery temperature of the battery 12 that is standing idle from the timing t1 to the timing ti. Furthermore, the time-series change of the battery temperature of the battery 12 that is in the idle state from the charging end timing (ti+Tc(ti)) to the scheduled departure timing t_start can be predicted based on the time-series change of the battery temperature described above. In this way, by considering the time-series change of the battery temperature, it is possible to accurately calculate the battery deterioration evaluation function Qbat(t) (battery deterioration evaluation value). Accordingly, even in a situation where the temperature is especially low or especially high, it is possible to further restrict the deterioration of the battery 12.

As made clear from Expression (3), the battery deterioration evaluation value becomes greater as the deterioration acceleration of the battery 12 increases. Furthermore, the battery deterioration evaluation value becomes smaller as the deterioration acceleration of the battery 12 decreases.

The coefficient k1 and the coefficient k2 are each set by the charging plan judging section 44, based on information indicating the will of the user. The information indicating the will of the user is held in advance in the vehicle history holding section 40. Alternatively, the coefficient k1 and the coefficient k2 may each be set by having the user manipulate the on-board display 26. Furthermore, the coefficient k1 and the coefficient k2 may each be set by having the user manipulate the manipulating section 50 of the smart device 22.

The coefficient k3 is a third weighting coefficient indicating whether charging of the battery 12 will end by the charging end timing tcf. The third weighting coefficient is referred to below as the charging end evaluation value. Here, the evaluation function Q(t) is a value in a range from 0 to 1. If the charging of the battery 12 will end by the charging end timing tcf, the coefficient k3 is set to 0. If the charging of the battery 12 will not end by the charging end timing tcf, the coefficient k3 is set to 1. In other words, if the charging of the battery 12 will not end by the charging end timing tcf (scheduled departure timing t_start), the evaluation function Q(t) is set to 1, which is the highest value in the range that can be taken by the evaluation function Q(t).

In this way, the evaluation function Q(t) of Expression (1) (comprehensive evaluation value Q(t)) comprehensively evaluates the electricity cost, the deterioration acceleration of the battery 12, and whether or not charging will be completed by the charging end timing tcf, for the charging control of the battery 12.

As described above, the evaluation function Q(t) of Expression (1) (comprehensive evaluation value Q(t)) is obtained for each arbitrary timing t. In this specific example, the evaluation function Q(t) decreases along with the elapsed time from the home arrival timing t1, as shown in FIG. 5. The evaluation function Q(t) increases along with the elapsed time after having decreased to a minimum value (minimal value). The evaluation function Q(t) is fixed at the upper limit value in the time period from the charging start timing t_const.

Here, if the charging start timing tcs is set in a time period from the home arrival timing t1 to 10:00 PM, the comprehensive evaluation value Q(t) becomes higher. This is because the electricity cost is relatively high. This is also because, since the target SOC is reached quickly, the idle deterioration is prone to accelerating after the charging ends.

If the charging start timing tcs is set in the time period from 10:00 PM to 1:00 AM on the following day, the comprehensive evaluation value Q(t) is lower than in a case where the charging start timing tcs is set in a time period from the home arrival timing t1 to 10:00 PM. This is because the electricity cost is a relatively low cost. However, if the charging start timing tcs has been set in this time period, the target SOC is reached quickly and the idle deterioration progresses, and therefore the comprehensive evaluation value Q(t) is not significantly reduced.

If the charging start timing tcs is set in the time period from 1:00 AM on the following day to 3:00 AM on the following day, the comprehensive evaluation value Q(t) becomes lowest. This is because the electricity cost is a relatively low cost. This is also because the target SOC is reached immediately before the charging end timing tcf, so that the idle deterioration is suppressed. This is yet further because the charging is completed by the charging end timing tcf.

If the charging start timing tcs is set in the time period from 3:00 AM on the following day to 5:00 AM on the following day, the comprehensive evaluation value Q(t) increases. If the charging start timing tcs is set in the time period from 5:00 AM on the following day, the comprehensive evaluation value Q(t) reaches the upper limit value. In other words, if the charging starts during the time period from the charging start timing t_const, the charging will not be completed by the charging end timing tcf, and therefore the comprehensive evaluation value Q(t) becomes the upper limit value.

In this way, if the timing at which the evaluation function Q(t) becomes the minimum value is set as the optimal timing tcs_opt, the electricity cost becomes relatively inexpensive. Furthermore, if the timing at which the evaluation function Q(t) becomes the minimum value is set as the optimal timing tcs_opt, the deterioration of the battery 12 becomes small. Yet further, if the timing at which the evaluation function Q(t) becomes the minimum value is set as the optimal timing tcs_opt, the charging will end by the charging end timing tcf. In other words, if the timing at which the evaluation function Q(t) becomes the minimum value is set as the optimal timing tcs_opt, it is possible to realize a reduction in the electricity cost and suppression of the deterioration of the battery 12.

FIGS. 6 and 7 are flow charts showing a process of setting the optimal timing tcs_opt and a process of charging the battery 12 from the optimal timing tcs_opt to the charging end timing tcf. The processes of FIGS. 6 and 7 are mainly performed by the charging plan judging section 44 (see FIG. 1).

First, after the vehicle 16 (see FIG. 1) driven by the user has arrived at home, the user inserts the charging connector 34 of the charging equipment 18 into the charging port 30. Due to this, the charging connector 34 and the charging port 30 are connected. The charging implementing section 24 notifies the charging plan judging section 44, via the communication control unit 28 and the communicating section 36, that the charging of the battery 12 from the charging equipment 18 is possible.

At step S1 of FIG. 6, the charging plan judging section 44 (see FIG. 1) receives this notification and acquires the electricity cost of each time period (cost plan, electricity cost function). In this case, the charging plan judging section 44 acquires the cost plan stored in advance in the electricity cost table holding section 39. Alternatively, the charging plan judging section 44 acquires the cost plan via the communicating section 36 from the power company that the user has made a contract with. If the cost plan is acquired from the power company, the acquired cost plan is stored in the electricity cost table holding section 39.

The relationship between the SOC, the battery temperature, and the deterioration acceleration of the battery 12 is stored as a table in the vehicle history holding section 40. At the following step S2, the charging plan judging section 44 references the vehicle history holding section 40 and acquires the deterioration acceleration of the battery 12 with respect to the SOC and battery temperature.

At step S3, the charging plan judging section 44 acquires the scheduled departure timing t_start.

The charging plan judging section 44 issues a transmission request for the scheduled departure timing t_start to the communication control unit 28 of the vehicle 16 through the communicating section 36. The on-board display 26 provides a display or the like prompting input of the scheduled departure timing t_start, based on the transmission request received by the communication control unit 28. After checking the display content of the on-board display 26, the user manipulates the on-board display 26 to input the scheduled departure timing t_start. Due to this, the charging plan judging section 44 can acquire the scheduled departure timing t_start input by the user, via the communication control unit 28 and the communicating section 36.

Alternatively, the charging plan judging section 44 may issue the transmission request for the scheduled departure timing t_start to the communicating section 46 of the smart device 22 via the communicating section 36. The display section 48 of the smart device 22 provides a display prompting input of the scheduled departure timing t_start, based on the transmission request received by the communicating section 46. After checking the display content of the display section 48, the user manipulates the manipulating section 50 to input the scheduled departure timing t_start. Due to this, the charging plan judging section 44 can acquire the scheduled departure timing t_start input by the user, via each of the communicating sections 36 and 46.

At step S4, the charging plan judging section 44 acquires charging equipment information indicating the characteristics of the charging equipment 18. Examples of the characteristics of the charging equipment 18 include whether normal charging is to be performed, whether fast charging is to be performed, and the like, as described above. The charging plan judging section 44 references the charging equipment information initially set by the user. Alternatively, if the charging equipment information is stored in advance in the vehicle history holding section 40, the charging plan judging section 44 should reference the charging equipment information stored in the vehicle history holding section 40. The charging plan judging section 44 may skip the acquiring process of step S4 if the charging equipment information is known in advance.

The charging implementing section 24 sequentially acquires the various types of information concerning the vehicle 16 (battery 12), using sensors (not shown in the drawings). Examples of the various types of information include the SOC of the battery 12, the battery temperature, the temperature outside the vehicle 16, and the like. At the following step S5, the charging plan judging section 44 acquires the various types of information concerning the vehicle 16 from the charging implementing section 24, via the communication control unit 28 and the communicating section 36.

At the following step S6, the charging plan judging section 44 sets the target SOC. In this case, in the same manner as in step S3, the user manipulates the on-board display 26 to input the target SOC. Alternatively, the user may manipulate the manipulating section 50 of the smart device 22 to input the target SOC. The charging plan judging section 44 sets the target SOC input by the user. Alternatively, the charging plan judging section 44 may reference the travel history of the vehicle 16 held in the vehicle history holding section 40 to set the target SOC. The target SOC is an SOC corresponding to a sufficient charge amount needed to prevent any trouble for the convenience of the user. Specifically, the target SOC is an SOC corresponding to the charge amount needed for the next travel of the vehicle 16, for example.

At step S7, the charging plan judging section 44 predicts the transition over time (time-series transition) of the battery temperature from the current timing, based on the information acquired at step S5.

At the following step S8, the charging plan judging section 44 calculates the charging end timing tcf. The charging end timing tcf is a timing that includes the margin of the certain time Tm from the scheduled departure timing t_start. Next, the charging plan judging section 44 calculates the charging time Tc. The charging time Tc is calculated based on the target SOC, the current SOC, the charging equipment information, the time-series transition of the battery temperature, and the like. Next, the charging plan judging section 44 calculates the charging start timing t_const by back-calculating the charging time Tc from the charging end timing tcf.

At the following step S9, the charging plan judging section 44 determines the evaluation function Q(t) of Expression (1) above. As described above, the charging plan judging section 44 has already acquired or calculated the electricity cost, the deterioration acceleration (deterioration characteristic) of the battery 12, and the scheduled departure timing t_start.

Furthermore, the charging plan judging section 44 sets the coefficient k1 and the coefficient k2 according to the will of the user. For example, if the user is focused more on reducing the electricity cost than on suppressing deterioration of the battery 12 when charging the battery 12, the coefficient k1 is set to be greater than the coefficient k2 (k1>k2). Furthermore, if the user is more focused on suppressing the deterioration of the battery 12 than on reducing the electricity cost, the coefficient k2 is set to be greater than the coefficient k1 (k1<k2). In the same manner as in the acquiring process of step S3, the charging plan judging section 44 issues a request for transmission of the information concerning the will of the user to the vehicle 16 or the smart device 22 through the communicating section 36. Due to this, the user can select whether to focus on (prioritize) reducing the electricity cost or suppressing the deterioration of the battery 12. The charging plan judging section 44 should set the coefficient k1 and the coefficient k2 in consideration of the result of the selection by the user. Alternatively, the vehicle history holding section 40 may store in advance the information concerning the will of the user. The charging plan judging section 44 can set the coefficient k1 and the coefficient k2 based on this information.

If the current timing is earlier than the charging start timing t_const, the coefficient k3 is set to 0. That is, if charging will end by the charging end timing tcf, the coefficient k3 is set to 0. Furthermore, if the current timing is the charging start timing t_const or later, the coefficient k3 is set to 1. That is, if charging will not end by the charging end timing tcf, the coefficient k3 is set to 1.

Furthermore, k(t) of Expression (3) is set based on the SOC, battery temperature, and deterioration acceleration of the battery 12 at the timing t.

In this way, by setting each coefficient and each function of Expressions (1) to (3), the charging plan judging section 44 can determine the evaluation function Q(t).

At step S10 of FIG. 7, the charging plan judging section 44 (see FIG. 1) sets the variable i of the given timing ti to 1. In other words, the given timing ti is set to the home arrival timing t1. The variable i is an integer greater than or equal to 1. The unit of each timing may be any one of seconds, minutes, and hours.

At the following step S11, the charging plan judging section 44 calculates the value of the evaluation function Q(t) for a case where charging of the battery 12 is started at the home arrival timing t1 (timing ti) using Expressions (1) to (3). In other words, the charging plan judging section 44 calculates the comprehensive evaluation value Q(t) using Expressions (1) to (3). In this case, the charging plan judging section 44 calculates the comprehensive evaluation value Q(t1) for a case where the battery 12 is charged for the charging time Tc from the home arrival timing t1.

In the following description, the evaluation function Q(ti) at the timing ti is referred to as the evaluation function Q(i), for the sake of convenience. Furthermore, the comprehensive evaluation value Q(ti) is referred to as the comprehensive evaluation value Q(i).

At the following step S12, the charging plan judging section 44 calculates the comprehensive evaluation value Q(i+1) at the timing t(i+1), which is a prescribed time (time α) later than the timing ti. In this case, since i=1, the charging plan judging section 44 calculates the comprehensive evaluation value Q(t) at the timing t2. In other words, the charging plan judging section 44 calculates the comprehensive evaluation value Q(t2) for a case where the battery 12 is charged for the charging time Tc from the timing t2.

At the following step S13, the charging plan judging section 44 makes a comparison between the value of the evaluation function Q(t) at the timing ti and the value of the evaluation function Q(t) at the timing t(i+1), and judges whether Q(i)<Q(i+1). In other words, the charging plan judging section 44 makes a comparison between the comprehensive evaluation value Q(i) and the comprehensive evaluation value Q(i+1), and judges whether Q(i)<Q(i+1).

At step S13, if Q(i)<Q(i+1) (step S13: YES), the process moves to step S14. At step S14, the charging plan judging section 44 sets the timing ti as the optimal timing tcs_opt. When Q(i) and Q(i+1) are compared, Q(i) is smaller. Therefore, if the charging of the battery 12 is started from the timing ti, the charging will end by the charging end timing tcf. Accordingly, it is possible to reduce the electricity cost and suppress deterioration of the battery 12.

Furthermore, at step S13, if Q(i)≥Q(i+1) (step S13: NO), the processing of step S14 is skipped and the process moves to step S15. When Q(i) and Q(i+1) are compared, Q(i) is greater than or equal to Q(i+1). Therefore, even if charging of the battery 12 is started from the timing ti, it becomes difficult to reduce the electricity cost and suppress the deterioration of the battery 12.

At the following step S15, the charging plan judging section 44 judges whether the timing ti has reached the charging start timing t_const.

At step S15, if the timing ti has not reached the charging start timing t_const (step S15: NO), the process moves to step S16. At step S16, the charging plan judging section 44 increments the variable i. After this, the process returns to step S12, and the processing of steps S12 to S15 is repeated. In this way, the charging plan judging section 44 repeats the calculation of the comprehensive evaluation value Q(i) at the timing ti and the update of the optimal timing tcs_opt, with an interval of a prescribed time from the home arrival time t1 therebetween.

At step S15, if the timing ti has reached the charging start timing t_const (step S15: YES), the processing of steps S12 to S16 ends, and the optimal timing tcs_opt is confirmed.

At the following step S17, the charging plan judging section 44 transmits information concerning the confirmed optimal timing tcs_opt and information concerning the target SOC to the charging implementing section 24, via the communicating section 36 and the communication control unit 28. In other words, the charging plan judging section 44 transmits the charging schedule to the charging implementing section 24. Due to this, the charging implementing section 24 starts charging of the battery 12 when the optimal timing tcs_opt is reached, based on the received charging schedule.

Even after the charging has started, the charging implementing section 24 sequentially acquires the current SOC of the battery 12. At step S18, when the current SOC reaches the target SOC (step S18: YES), the process moves to step S19. At step S19, the charging implementing section 24 ends the charging of the battery 12. Due to this, it is possible to end the charging of the battery 12 by the charging end timing tcf.

There are cases where the cost plan (time period when the electricity cost is low) differs due to differences between countries, geographical regions, and power companies. Therefore, when performing the process of FIGS. 6 and 7, the charging plan judging section 44 may check the history of previous charging control stored in the vehicle history holding section 40. If there is no change in the electricity cost between the previous process and the current process, the previous electricity cost can be used as-is. Due to this, some of the processing of steps S1 and S2 are skipped, and therefore it is possible to make the setting of the charging schedule more efficient. However, if there is a change in the electricity cost between the previous charging control and the current charging control, the processing is performed in the order of the flow charts of FIGS. 6 and 7.

The process shown in FIGS. 6 and 7 is performed on the condition that a plug-in connection is established between the charging connector 34 of the charging equipment 18 and the charging port 30 of the vehicle 16. The process of FIGS. 6 and 7 may be performed when a state is reached in which non-contact charging of the battery 12 from the charging equipment 18 is possible.

At steps S17 and S18 of FIG. 7, if the breaker of the charging equipment 18 has been tripped and charging has stopped, charging may be resumed according to the initial charging schedule when an activation signal (CPL signal) from the charging equipment 18 is again detected. Furthermore, if the charging connector 34 has been removed from the charging port 30, the charging schedule is not reset. In such a case, when the charging connector 34 and the charging port 30 are reconnected, the calculation of the evaluation function Q(t) for the charging schedule may be performed again, and the charging schedule may be set again.

If the comprehensive evaluation value Q(i) in a case where charging is performed from the current timing (timing ti) and the comprehensive evaluation value Q(i+1) in a case where charging is performed from a prescribed time later (timing t(i+1)) are the same, the charging may be started after the prescribed time has passed. In other words, if Q(i)=Q(i+1), the charging may be started after the prescribed time has passed. Due to this, the timing t(i+1) corresponding to Q(i+1) is updated to be the optimal timing tcs_opt.

If an evaluation function Q(t) such as shown in FIG. 5 is obtained, the evaluation function Q(t) may be calculated for each interval of a prescribed time within a range from the timing t1 to the charging end timing tcf. In other words, the evaluation function Q(t) is calculated at each timing ti by repeating steps S12 to S16.

Alternatively, if it is understood in advance from the electricity cost table or the like that there is only one downwardly convex inflection in the evaluation function Q(t), the evaluation function Q(t) may be calculated for each prescribed time interval from the timing t1. The evaluation function Q(t) at each timing ti is calculated by repeating steps S12 to S16. As a result, the timing at which the evaluation function Q(t) inverts to rise from the minimum value can be confirmed as the optimal timing tcs_opt. In this case, the process of steps S12 to S16 maybe stopped at the timing when the optimal timing tcs_opt is confirmed, and the process may move to the processing of step S17 and onward.

Alternatively, a process of calculating the optimal timing tcs_opt may be performed a plurality of times while suitably changing the prescribed time interval described above. In other words, an optimization calculation for searching for the optimal timing tcs_opt may be performed a plurality of times while suitably changing the prescribed time interval described above.

Specifically, in the first instance of the calculation process, the time α is set to a relatively large value α1. That is, in a state where the prescribed time interval is set to be large, the process of steps S12 to S16 is performed repeatedly. Due to this, the optimal timing tcs_opt1 is roughly calculated.

In the second instance of the calculation, the time α is set to a value α2, which is smaller than al. Next, the evaluation function Q(t) is calculated for a time period including the optimal timing tcs_opt1 obtained from the first instance of the calculation. In other words, in a state where the time α has been set to α2, the evaluation function Q(t) is calculated for each time period from the timing (tcs_opt1−α1) to the timing (tcs_opt1+α1). Next, in a state where the time α is set to α2, the process of steps S12 to S16 is performed repeatedly. Due to this, the evaluation function Q(t) at each timing ti in this time period is calculated in a state where the timing a is set to the relatively small value α2. As a result, the optimal timing tcs_opt2 is obtained.

In the third instance of the calculation process as well, a technique similar to that described above is used. That is, the time α and the target time period are both set to be shorter, and the optimal timing tcs_opt is calculated.

Due to this, the computational processing load when calculating the optimal timing tcs_opt is reduced. Furthermore, it is possible to accurately set the optimal timing tcs_opt in a shorter time from when the user connects the vehicle 16 to the charging equipment 18.

The present invention is not limited to the above-described embodiments, and it goes without saying that various alternative or additional configurations could be adopted therein without departing from the scope of the present invention.

The following is a record of the invention that can be understood from the embodiment described above.

A first aspect of the present invention is a charging control apparatus (10) that controls charging of a battery (12) from an external power source (18), comprising a current SOC acquiring section (44) that acquires a current SOC of the battery; a target SOC acquiring section (44) that acquires a target SOC; an electricity cost acquiring section (44) that acquires an electricity cost per unit of power of the external power source; and a charging schedule setting section (44)

that sets a charging schedule of the battery in a manner to lower deterioration acceleration of the battery by comparing the current SOC to the target SOC, while considering the electricity cost.

In the present invention, the battery charging schedule is set in consideration of both the electricity cost and the deterioration characteristic of the battery (ease of deterioration of the battery) before charging and after charging. By charging the battery from the external power source in accordance with this charging schedule, it is possible to suppress the battery deterioration while reducing the electricity cost.

In the first aspect of the present invention, the charging control apparatus further comprises a scheduled drive timing acquiring section (44) that acquires a scheduled drive timing (t_start) of a moving body (16) including the battery; and a deterioration acceleration acquiring section (44) that acquires the deterioration acceleration of the battery. Furthermore, the moving body is driven by power supplied from the battery; and when the battery is in a chargeable state, the charging schedule setting section specifies the deterioration acceleration of the battery with respect to the current SOC and the target SOC based on the deterioration acceleration acquired by the deterioration acceleration acquiring section and sets the charging schedule such that deterioration acceleration of the battery stays in a relatively low state until the scheduled drive timing.

Due to this, the time during which the battery remains in a state of which deterioration acceleration is reduced, and therefore it is possible to suppress the battery deterioration.

In the first aspect of the present invention, the schedule setting section specifies the deterioration acceleration of the battery with respect to the current SOC and the current battery temperature and the deterioration acceleration of the battery with respect to the target SOC and the battery temperature after charging ends, based on the deterioration acceleration acquired by the deterioration acceleration acquiring section, and sets the charging schedule such that the deterioration acceleration of the battery remains in a relatively low state until the scheduled drive timing.

Due to this, when the battery is heated in a low-temperature environment, even if a timer for activating the air conditioning is set according to the scheduled drive timing, for example, it is possible to accurately set the charging schedule.

In the first aspect of the present invention, the charging control apparatus further comprises an evaluation value acquiring section (44) that acquires an evaluation value (Q(i)), which concerns the deterioration acceleration of the battery and the electricity cost when charging the battery from the current SOC at a current timing (ti) up to the target SOC, and an evaluation value (Q(i+1)), which concerns the deterioration acceleration of the battery and the electricity cost when charging the battery from the current SOC at a timing (t(i+1)) that is a certain time (a) after the current timing up to the target SOC. Furthermore, the charging schedule setting section makes a comparison between each acquired evaluation value, and sets a charging start timing (tcs, tcs_opt) for actually starting the charging of the battery at a timing of whichever evaluation value is lower.

Due to this, it is possible to set a suitable charging start timing (optimal timing).

In the first aspect of the present invention, the charging schedule setting section: makes a comparison between the evaluation value for the current timing and the evaluation value for the timing that is the certain time after the current timing, each time the evaluation value acquiring section acquires the evaluation value at intervals of the certain time; if the evaluation value for the timing that is the certain time after the current timing is lower, selects the timing of the low evaluation value; and if the evaluation value for the timing that is the certain time after the current timing is higher than the evaluation value for the current timing, sets the current timing as the charging start timing and stops a process of acquiring the evaluation value with the evaluation acquiring section.

Due to this, it is possible to make the setting process more efficient while avoiding the setting of a charging start timing that would result in the charging not ending by the scheduled drive timing.

In the first aspect of the present invention, the charging schedule setting section: makes a comparison between the evaluation value for the current timing and the evaluation value for the timing that is the certain time after the current timing, each time the evaluation value acquiring section acquires the evaluation value at intervals of the certain time, and selects the timing of the low evaluation value; and sets the timing of the lowest evaluation value as the charging start timing.

In this case as well, it is possible to avoid the setting of a charging start timing that would result in the charging not ending by the scheduled drive timing.

In the first aspect of the present invention, the charging schedule setting section performs the process of selecting the timing of the lowest evaluation value a plurality of times by varying the intervals of the certain time.

Due to this, the computational processing load when calculating the charging start timing is lowered. Furthermore, the charging start timing can be set accurately in a shorted time from when the user connects the charging equipment to the vehicle.

In the first aspect of the present invention, the charging schedule setting section sets a timing of a smallest evaluation value, among the evaluation values that cause the charging of the battery to end by the scheduled drive timing, as the charging start timing.

Due to this, it is possible to reliably avoid the setting of a charging start timing that would result in the charging not ending by the scheduled drive timing.

In the first aspect of the present invention, the evaluation value is the sum of: an electricity cost evaluation value obtained as the product of an effective power supplied to the battery from the external power source, a unit value of the electricity cost, and a first weighting coefficient (k1); a battery deterioration evaluation value obtained as the product of a time integral of a deterioration characteristic coefficient, indicating deterioration of the battery in a time period from a previous drive completion timing of the moving body to the scheduled drive timing, and a second weighting coefficient (k2); and a charging end evaluation value (k3) for evaluating whether the charging of the battery will end by the scheduled drive timing.

Due to this, the setting of the charging start timing (optimal timing) can be performed accurately.

In the first aspect of the present invention, if the user of the moving body focuses on the electricity cost over the deterioration of the battery, the first weighting coefficient is set to be greater than the second weighting coefficient; if the user focuses on the deterioration of the battery over the electricity cost, the second weighting coefficient is set to be greater than the first weighting coefficient; if the charging of the battery will end by the scheduled drive timing, the charging end evaluation value is set to be low; and if the charging of the battery will not end by the scheduled drive timing, the charging end evaluation value is set to be high.

Due to this, the setting of the charging start timing (optimal timing) can be performed even more accurately.

In the first aspect of the present invention, if there is no change between the electricity cost for a previous instance of charging the battery and the electricity cost for a current instance of charging the battery, the charging schedule setting section calculates the electricity cost evaluation value using the electricity cost for the previous instance of charging the battery.

Due to this, it is possible to improve the efficiency of the setting of the charging schedule.

In the first aspect of the present invention, if the user of the moving body has made a variable tariff rate contract whereby the electricity cost varies according to a power supply and demand balance every day, the charging schedule setting section periodically acquires the electricity cost and calculates the electricity cost evaluation value using the electricity cost of the corresponding day.

Due to this, it is possible to improve the efficiency of the setting of the charging schedule. Furthermore, since the electricity cost is acquired periodically in the case of a variable tariff fee contract, this electricity cost is updated automatically. As a result, the electricity cost evaluation value can be calculated accurately.

In the first aspect of the present invention, the charging schedule setting section calculates the electricity cost evaluation value while considering a time-series change of the effective power and unit value of the electricity cost and the first weighting coefficient.

Due to this, the setting of the charging start timing (optimal timing) can be performed accurately.

In the first aspect of the present invention, the charging schedule setting section sets the charging schedule such that the charging of the battery ends by a prescribed time (Tm) before the scheduled drive timing.

Due to this, the user can depart in the moving body while maintaining a buffer.

A second aspect of the present invention is a moving body comprising the charging control apparatus described above and a battery.

This invention can easily realize each of the effects described above.

A third aspect of the present invention is a charging control system comprising the charging control apparatus described above and a battery.

This invention can easily realize each of the effects described above.

A fourth aspect of the present invention is a charging control method for controlling charging of a battery from an external power source, comprising a step (step S5) of acquiring a current SOC of the battery with a current SOC acquiring section; a step (step S6) of acquiring a target SOC of the battery with a target SOC acquiring section; a step (step S1) of acquiring an electricity cost per unit power of the external power source with an electricity cost acquiring section; and a step (step S9 to step S16) of setting a charging schedule with a charging schedule setting section such that deterioration acceleration of the battery is lowered, by making a comparison between the current SOC and the target SOC, while considering the electricity cost.

In the present invention, the battery charging schedule is set in consideration of both the electricity cost and the deterioration characteristic of the battery (ease of deterioration of the battery) before charging and after charging. By charging the battery from the external power source in accordance with this charging schedule, it is possible to suppress the battery deterioration while reducing the electricity cost.

What is claimed is:

1. A charging control apparatus that controls charging of a battery from an external power source, comprising one or more processors that execute computer-executable instructions stored in a memory,
wherein the one or more processors execute the computer-executable instructions to cause the charging control apparatus to:
acquire a current state of charge of the battery;
acquire a target state of charge;
acquire an electricity cost per unit of power of the external power source;
acquire deterioration acceleration of the battery;
acquire an evaluation value, which concerns the deterioration acceleration of the battery and the electricity cost when charging the battery from the current state of charge at a current timing up to the target state of charge, the lower the electricity cost and the lower the deterioration acceleration of the battery, the smaller the evaluation value;
each time the evaluation value is acquired at intervals of a first certain time, make a comparison between the evaluation value for the current timing and the evaluation value for the timing that is the first certain time after the current timing, in order to specify a lower one of the evaluation value as a first evaluation value;
within a time period between the first certain time before and after a timing at which the first evaluation value is acquired, each time the evaluation value is acquired at intervals of a second certain time shorter than the first certain time, make a comparison between the first evaluation value and the evaluation value for the timing at each time the second certain time has passed;
set a charging schedule of the battery by setting a charging start timing for actually starting the charging of the battery at a timing of whichever evaluation value is lowest; and
start the charging of the battery from an external power source at the charging start timing in accordance with the charging schedule.

2. The charging control apparatus according to claim 1, wherein the one or more processors cause the charging control apparatus to:
acquire a scheduled drive timing of a moving body including the battery; and
wherein:
the moving body is driven by power supplied from the battery; and
when the battery is in a chargeable state, the one or more processors cause the charging control apparatus to specify the deterioration acceleration of the battery with respect to the current state of charge and the target state of charge based on the acquired deterioration acceleration and set the charging schedule such that deterioration acceleration of the battery remains relatively low state until the scheduled drive timing.

3. The charging control apparatus according to claim 2, wherein the one or more processors cause the charging control apparatus to:
specify the deterioration acceleration of the battery with respect to the current state of charge and a current battery temperature and the deterioration acceleration of the battery with respect to the target state of charge and a battery temperature after charging ends, based on the acquired deterioration acceleration, and set the charging schedule such that the deterioration acceleration of the battery remains relatively low until the scheduled drive timing.

4. The charging control apparatus according to claim 1, wherein the one or more processors cause the charging control apparatus to:
make a comparison between the evaluation value for the current timing and the evaluation value for the timing that is the certain time after the current timing, each time the evaluation value is acquired at intervals of the certain time;
if the evaluation value for the timing that is the certain time after the current timing is lower, select the timing of the low evaluation value; and
if the evaluation value for the timing that is the certain time after the current timing is higher than the evaluation value for the current timing, set the current timing as the charging start timing and stops a process of acquiring the evaluation value.

5. The charging control apparatus according to claim 1, wherein the one or more processors cause the charging control apparatus to perform the process of selecting the timing of the lowest evaluation value a plurality of times by varying the intervals of the certain time.

6. The charging control apparatus according to claim 2, wherein the one or more processors cause the charging control apparatus to set a timing of a smallest evaluation value, among the evaluation values that cause the charging of the battery to end by the scheduled drive timing, as the charging start timing.

7. The charging control apparatus according to claim 2, wherein the evaluation value is determined using:
an electricity cost evaluation value obtained as the product of an effective power supplied to the battery from the external power source, a unit value of the electricity cost, and a first weighting coefficient set in such a manner that the evaluation value takes a value between 0 and 1;
a battery deterioration evaluation value obtained as the product of a time integral of a deterioration characteristic coefficient, indicating deterioration of the battery in a time period from a previous drive completion timing of the moving body to the scheduled drive timing, and a second weighting coefficient set in such a manner that the evaluation value takes a value between 0 and 1; and
a charging end evaluation value for evaluating whether the charging of the battery will end by the scheduled drive timing.

8. The charging control apparatus according to claim 7, wherein:
if the user of the moving body focuses on the electricity cost over the deterioration of the battery, the first weighting coefficient is set to be greater than the second weighting coefficient;
if the user focuses on the deterioration of the battery over the electricity cost, the second weighting coefficient is set to be greater than the first weighting coefficient;
if the charging of the battery will end by the scheduled drive timing, the charging end evaluation value is set to be low; and
if the charging of the battery will not end by the scheduled drive timing, the charging end evaluation value is set to be high.

9. The charging control apparatus according to claim 7, wherein:

if there is no change between the electricity cost for a previous instance of charging the battery and the electricity cost for a current instance of charging the battery, the one or more processors cause the charging control apparatus to calculate the electricity cost evaluation value using the electricity cost for the previous instance of charging the battery.

10. The charging control apparatus according to claim 7, wherein:
if the user of the moving body has made a variable tariff rate contract whereby the electricity cost varies according to a power supply and demand balance every day, the one or more processors cause the charging control apparatus to periodically acquire the electricity cost and calculates the electricity cost evaluation value using the electricity cost of a corresponding day.

11. The charging control apparatus according to claim 7, wherein the one or more processors cause the charging control apparatus to calculate the electricity cost evaluation value while considering a time-series change of the effective power and the unit value of the electricity cost and the first weighting coefficient.

12. The charging control apparatus according to claim 2, wherein the one or more processors cause the charging control apparatus to set the charging schedule such that the charging of the battery ends by a prescribed time before the scheduled drive timing.

13. A moving body comprising the charging control apparatus according to claim 1 and a battery.

14. A charging control system comprising the charging control apparatus according to claim 1 and a battery.

15. A charging control method for controlling charging of a battery from an external power source, comprising:
acquiring a current state of charge of the battery with a current state-of-charge acquiring section;
acquiring a target state of charge of the battery with a target state-of-charge acquiring section;
acquiring an electricity cost per unit power of the external power source with an electricity cost acquiring section;
acquiring deterioration acceleration of the battery;
acquiring an evaluation value, which concerns the deterioration acceleration of the battery and the electricity cost when charging the battery from the current state of charge at a current timing up to the target state of charge, the lower the electricity cost and the lower the deterioration acceleration of the battery, the smaller the evaluation value;
each time the evaluation value is acquired at intervals of a first certain time, making a comparison between the evaluation value for the current timing and the evaluation value for the timing that is the first certain time after the current timing, in order to specify a lower one of the evaluation value as a first evaluation value;
within a time period between the first certain time before and after a timing at which the first evaluation value is acquired, each time the evaluation value is acquired at intervals of a second certain time shorter than the first certain time, making a comparison between the first evaluation value and the evaluation value for the timing at each time the second certain time has passed;
setting a charging schedule with a charging schedule setting section by setting a charging start timing for actually starting the charging of the battery at a timing of whichever evaluation value is lowest; and
starting the charging of the battery from an external power source at the charging start timing in accordance with the charging schedule.

16. A charging control apparatus that controls charging of a battery from an external power source, comprising one or more processors that execute computer-executable instructions stored in a memory,
  wherein the one or more processors execute the computer-executable instructions to cause the charging control apparatus to:
  acquire a current state of charge of the battery;
  acquire a target state of charge;
  acquire deterioration acceleration of the battery; acquire an evaluation value, which concerns the deterioration acceleration of the battery when charging the battery from the current state of charge at a current timing up to the target state of charge, the lower the deterioration acceleration of the battery, the smaller the evaluation value;
  each time the evaluation value is acquired at intervals of a first certain time, make a comparison between the evaluation value for the current timing and the evaluation value for the timing that is the first certain time after the current timing, in order to specify a lower one of the evaluation value as a first evaluation value;
  within a time period between the first certain time before and after a timing at which the first evaluation value is acquired, each time the evaluation value is acquired at intervals of a second certain time shorter than the first certain time, make a comparison between the first evaluation value and the evaluation value for the timing at each time the second certain time has passed;
  set a charging schedule of the battery by setting a charging start timing for actually starting the charging of the battery at a timing of whichever evaluation value is lowest; and
  start the charging of the battery from an external power source at the charging start timing in accordance with the charging schedule.

17. A charging control method for controlling charging of a battery from an external power source, comprising:
  acquiring a current state of charge of the battery with a current state-of-charge acquiring section;
  acquiring a target state of charge of the battery with a target state-of-charge acquiring section;
  acquiring deterioration acceleration of the battery;
  acquiring an evaluation value, which concerns the deterioration acceleration of the battery when charging the battery from the current state of charge at a current timing up to the target state of charge, the lower the deterioration acceleration of the battery, the smaller the evaluation value;
  each time the evaluation value is acquired at intervals of a first certain time, making a comparison between the evaluation value for the current timing and the evaluation value for the timing that is the first certain time after the current timing, in order to specify a lower one of the evaluation value as a first evaluation value;
  within a time period between the first certain time before and after a timing at which the first evaluation value is acquired, each time the evaluation value is acquired at intervals of a second certain time shorter than the first certain time, making a comparison between the first evaluation value and the evaluation value for the timing at each time the second certain time has passed;
  setting a charging schedule with a charging schedule setting section by setting a charging start timing for actually starting the charging of the battery at a timing of whichever evaluation value is lowest; and
  starting the charging of the battery from an external power source at the charging start timing in accordance with the charging schedule.

* * * * *